United States Patent [19]

Shinoi et al.

[11] 3,872,261

[45] Mar. 18, 1975

[54] SWITCHING APPARATUS FOR USE IN A PAGING SYSTEM OF A KEY TELEPHONE SYSTEM

[75] Inventors: Tsuyoshi Shinoi, Kawasaki; Fumio Tsutsumi, Yokohama, both of Japan; Stephen E. Kerman, Merrick, N.Y.

[73] Assignees: Nippon Tsu Shin Kogyo K.K., Kawasaki-shi, Kanagawa-ken, Japan; TIE/Communications Inc., Stamford, Conn.

[22] Filed: Apr. 5, 1973

[21] Appl. No.: 348,130

[52] U.S. Cl. .............................. 179/99, 179/18 BF

[51] Int. Cl. .......................................... H04m 3/42

[58] Field of Search............ 179/99, 37, 18 BF, 1 H

[56] References Cited

UNITED STATES PATENTS 3,267,219 8/1966 Van Horn ...................... 179/18 BF 3,576,397 4/1971 Pell et al. ........................... 179/1 R

*Primary Examiner*—William C. Cooper

*Assistant Examiner*—Mitchell Saffian

*Attorney, Agent, or Firm*—Kenyon & Kenyon Reilly Carr & Chapin

[57] ABSTRACT

Switching apparatus for use in a paging system of a key telephone system is disclosed by which voice paging signals, central office arrival signals and other signals can be transmitted to multiple internal zones, made up of a plurality of key telephones having internal amplifiers and speakers. Additionally both voice paging signals and at least one other signal can be transmitted to multiple external zones comprising speakers only. By the proper selection of connections various combinations of internal and external zones are possible.

6 Claims, 1 Drawing Figure

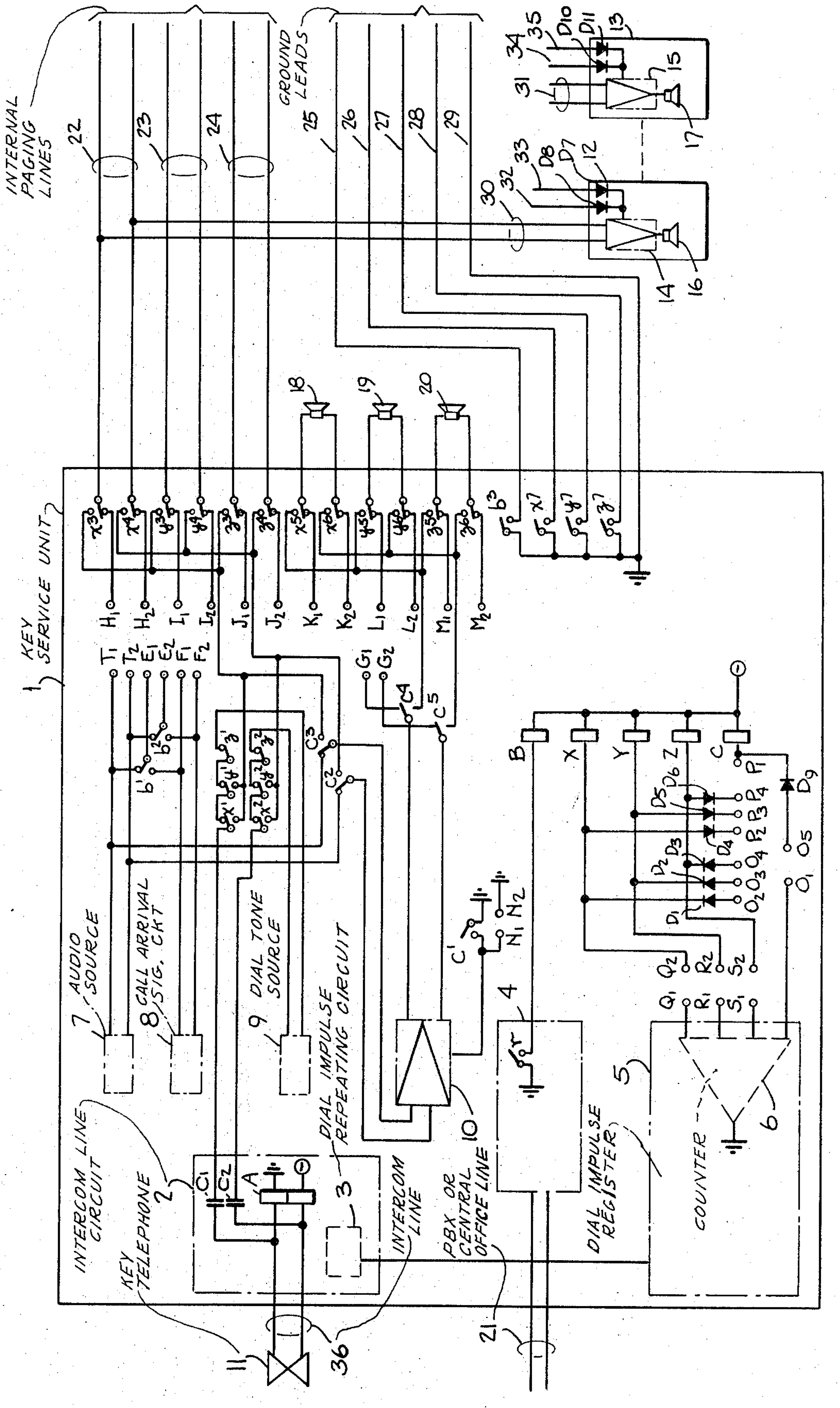
INTERNAL PAGING LINES
GROUND LEADS
KEY SERVICE UNIT
AUDIO SOURCE
CALL ARRIVAL SIG. CKT
DIAL TONE SOURCE
DIAL IMPULSE REPEATING CIRCUIT
INTERCOM LINE CIRCUIT
KEY TELEPHONE
INTERCOM LINE
PBX OR CENTRAL OFFICE LINE
DIAL IMPULSE REGISTER
COUNTER

SWITCHING APPARATUS FOR USE IN A PAGING SYSTEM OF A KEY TELEPHONE SYSTEM

BACKGROUND OF THE INVENTION

The present invention relates to switching apparatus for a paging system of a key telephone system; more particularly, it relates to paging switching apparatus permitting multiple zone paging in which various combinations of signals can be applied to each or all of the zones.

In paging systems it is sometimes desirable to not only page an individual by voice communication over the paging system but to also transmit a tone signal or other type of signal indicating an incoming central office call for the individual or group of individuals within hearing range of the paging system. In addition it is desirable to have the ability to sub-divide the paging system into zones and supply various combinations of signals to each zone.

Finally it is desirable in some installations to use the paging system as a means of supplying background music or other information while still also maintaining the capability of paging and announcing central office calls.

It is further desirable in a key telephone system employing loudspeakers in the stations fed with a tone signal as a call alerting means to be able to group these loudspeakers and thus telephone sets into zones through which voice paging can be accomplished when desired, or other signals transmitted in the absence of the alerting tone or paging.

Thus it is an object of the present invention to provide a paging system flexible enough to permit voice paging if desired, central office call arrival tones if desired, and other audio signals such as background music if desired, on a paging system in a key telephone system comprised of external speakers and internal station speakers accessed from any station by using the telephone handset as a microphone.

It is also an object of this invention to provide a paging system flexible enought to permit the division of the system into plural internal and external zones. The external zones may convey voice paging and another audio signal, such as background music, while the internal zones may convey voice paging, background music, central office call arrival tones or various combinations of these signals sequentially, as required.

It is, therefore, an object of this invention that the paging system have sufficient flexibility to convey in each of the external or internal zones independently only those signals desired in the particular zone.

It is a further object of this invention to permit the arrangement of each zone within the system as either an internal or external zone, so that a selected zone within the system can be paged without paging all the zones in the system.

Similarly it is an object of this invention to have the ability, if desired, to page all speakers in all internal and external zones.

These objects and features are accomplished in the present invention by forming a plurality of internal paging zones, each zone having one or more internal amplifiers and speakers and equipped to convey exculsively, or conjunctively, voice paging, background music, or central office call arrival signals, amplify the signals and reproduce them over its speakers. Additionally, external zones, comprised of loudspeakers only powered by a common amplifier, are used to reproduce either voice paging or background music, or both.

BRIEF DESCRIPTION OF THE DRAWING

The invention, as well as its objects and features, will be better understood by reference to the following detailed description of the preferred embodiment of this invention taken in conjunction with the accompanying drawing which shows a schematic circuit diagram of the switching circuit used in this invention together with the terminals for connecting to the various external and internal zones.

DESCRIPTION OF THE PREFERRED EMBODIMENT

In the drawing, a key service unit 1 of a key telephone system, shown only in the parts necessary for understanding the present invention, has an intercom line circuit means 2 mounted within the key sevice unti 1. This circuit permits intercommunication between two or more key telephones and in this invention is utilized to permit paging by a key telephone through both the internal and external zones. Also within the intercom line circuit means is a dial impulse repeating circuit 3 used to repeat dial impulses on the intercom line circuit originating at a key telephone set. The relay A, within line circuit means 2, provides transmitter current to the key telephone sets for voice communication on the intercom line and supervises the line. The capacitors C1 and C2 are D.C. blocking capacitors for speech signal coupling.

A plurality of central office or PBX line circuit means 4 may be contained within the key service unit 1 for controlling the associated PBX or central office lines 21. Here, for simplicity, only one such circuit means 4 and line 21 are shown. Within this circuit, when a central office call is received, relay R (not shown) operates, contact r closes and operates the relay B.

A dial impulse register circuit 5 having a counting circuit 6 is used to count dial impulses from the dial impulse repeater 3 to select the correct output terminal according to the number dialled on the intercom line circuit 2, operate ralay *x*, *y* or *z* and to connect the inercom line circuit to the selected zone.

Independently of the paging function, an audio source 7 is used to provide background music, for example, and is connected to various terminals in the key service unit 1. A call arrival signalling circuit 8 generates a tone for transmittal to the internal zone speakers while the dial tone source 9 is used to indicate either a busy or idle condition when an intercom call is made. Amplifier 10, contained within key service unit 1, is used to amplify the voice paging signals from intercom line 2 and the background music from source 7. The output of amplifier 10 is then used to drive one or more of the external speakers 18, 19 or 20.

In operation in the voice paging mode, a key telephone set 11 seizes intercom line 36 and line circuit 2, and depending upon the wiring configuration adopted or the system, the calling party may, after dialling the appropriate number, make announcements through all or various of the external and internal zones. As shown in the drawing, an internal zone is comprised of a plurality of key telephones 12 and 13 each having amplifiers 14 and 15, and speakers 16 and 17, within the sets 12 and 13. They are connected by lines 30 and 31, for example, to internal paging lines 22, 23 and 24. Each line and its connected telephone set amplifiers and speakers therefore constitutes one internal zone. The lines 25 through 29 are ground leads used to turn amplifiers 14, 15, etc., within each key set on or off as required.

Thus, depending upon the internal connections between the various terminals, the dialling of a particular number at key telephone 11 pulses relay A, the pulses repeated at the output of 3 and counted within register 5 counting circuit 6 and connected to the appropriate lead Q1, R1, S1 or o1, relay X, Y, Z or C thereby being operated. 01, operation of these one or more relays connects a zone, X for example, comprised of the internal zone speaker 16 connected to line 22 and external zone speaker 18, thus permitting paging over both one internal and one external zone. Voice signals from the key telephone set are coupled from line 36 by capacitors C1 anc C2 and contacts *x*1, *x*2, *x*3 and *x*4 to line 22, and contacts *x*1, *x*2, *c*2 and *c*3 to the input of amplifier 10, and by contacts *c*4, *c*5, *x*5 and *x*6 to speaker 18.

In operation, it is possible to feed background music and voice paging to both internal and external zones when paging is not occurring by the proper selection of internal jumper connections within the switching device of the present invention. Similarly, by the proper selection of the internal zone external lead connections to the key telephone sets, call arrival signals together with background music and voice may be reproduced through the internal zones.

By way of the particular embodiment disclosed herein, there are 15 possible connections within the device leading to various combinations of internal and external zones. Following is a list of the various combinations of the internal and external zone configurations:

FIRST CONFIGURATION FOR AN INTERNAL ZONE

By connecting T1 to H1, T2 to H2, and lead 32 to lead 29, the background music signal of source 7 is applied to amplifier 14 of key telephone set 12 through break contacts *x*3 and *x*4, internal paging line 22 and input line 30. Because amplifier 14 is grounded through line 29, line 32 and diode D8, it amplifies the background music signal, driving speaker 16.

Thus by this one configuration background music may be applied through the switching device in the idle condition to the speaker of the telephone key set within the internal zone connected through contacts *x*3 and *x*4.

SECOND CONFIGURATION FOR AN INTERNAL ZONE

If terminal E1 is connected to H1, E1 to H2, and line 29 connected to line 32, amplifier 14 is grounded and the background music of signal device 7 is connected through break contacts *b*1, *b*2, *x*3, and *x*4, internal paging line 22 and input line 30, driving speaker 16. When a central office call signal is generated line circuit means 4, relay R operates closing contact r thereby operating relay B. By the operation of relay B, the call arrival signal of signal device 8 is applied through make contacts *b*1, *b*2, and break contacts *x*3, *x*4, to the internal paging line 22 and input line 30, and a call arrival tone signal is emitted from speaker 16 and any other key telephone set connected to the internal paging lines 22 and 29, switching the speaker from background music to the central office call arrival tone. When the central office call arrival signal stops, the output of speaker 16 is switched back to the background music.

Thus by this configuration it is possible to send both background music and a call arrival tone signal to a first internal zone of a paging system in a key telephone system when paging is not taking place.

THIRD CONFIGURATION FOR AN INTERNAL ZONE

If terminal F1 is connected to H1, F2 and H2, signal line 25 connected to line 32, the central office call arrival signal circuit 8 is connected to terminals F1 and F2, amplifier 14 through break contacts *x*3 and *x*4, internal paging line 22 and input line 30. Because, however, a ground signal is not supplied to amplifier 14, no central office call arrival tone is emitted from speaker 16. At this time if there is a call from the central office, relay B operates in the same manner as described for the second connection. Amplifier 14 is thus grounded via contact *b*3, signal line 25, line 32 and diode D8, with a central office call arrival tone emitted from speaker 16. When the central office call arrival signal from the office stops, no signal is emitted from speaker 16.

Thus by this configuration an internal speaker connected to internal paging line 22 can be used solely for the announcement of central office call arrival tones.

FOURTH CONFIGURATION FOR AN INTERNAL ZONE

When the first configuration is combined with the connection of terminals Q1 and Q2, background music is emitted from speaker 16 in the same manner as explained for the first configuration. Here, however, if the handset of key telephone set 11 is raised, and the line key for the intercom line circuit 2 is pushed, a current from relay A is supplied to the telephone set, and dial tone source 9 is connected to the key telephone set 11 via break contacts *x*1, *y*1, *z*1, *x*2, *y*2 and *z*2, capacitors C1 and C2 and intercom line 36. When dial tone is heard on telephone 11 from dial tone source 9 and the caller dials the appropriate number to operate relay X (hereafter called NX), dial impulses are sent from circuit means 3 to the register 5, and a ground is applied to relay X through counting circuit 6 and terminals Q1, Q2. Relay X operates and voice transmission from key telephone set 11 to amplifier 14 via internal paging line 36, capacitors C1 and C2, make contacts *x*1, *x*2, *x*3 and *x*4, paging line 22 and input line 30. Because amplifier 14 lead 32 is still grounded in accordance with the first configuration, the caller may "page" or deliver any desired message over speaker 16. When the handset of key telephone set 11 is restored after the completion of the call, the register 5 counting circuit 6 output is no longer grounded, relay X releases and returns to the condition of the first configuration, and background music is heard over speaker 16.

Thus by this combination of connections, internal paging signals are reproduced with background music or other appropriate signals in an amplifier and loudspeaker equipped key telephone.

FIFTH CONFIGURATION FOR AN INTERNAL ZONE

When the second connection arrangement is established, a central office call signal from central office line 21 is heard over speaker 16, while background music is heard when there is no central office call signal. Additionally, by the connection of Q1 and Q2 (the fourth configuration), when the caller at telephone set 11 dials the number NX, his voice will be heard over speaker 16 by the circuit operation as explained for the fourth configuration. When the handset of telephone set 11 is restored after call completion, relay X releases ad background music is reconnected to speaker 16 unless a central office call arrival signal is being received.

Thus by this combination of connections, paging from a key telephone set, incoming central office call signals and background music are reproduced through an internal zone in a key telephone paging system.

SIXTH CONFIGURATION FOR AN INTERNAL ZONE

If terminal Q1 is connected with Q2, lead 26 with lead 33 of the key telephone 12, and the third configuration is established, namely, connecting terminals F1 to H1 and F2 to H2, the internal paging function will be combined with the function of central office call signalling through speaker 16. In this particular configuration no background music is provided.

Thus when number NX is dialled at key telephone set 11, the caller's voice is heard from speaker 16 because amplifier 14 is grounded through contact *x*7, leads 26 and 33, and diode D7. Upon the completion of paging and replacement of the handset on the hookswitch, relay X releases and the circuit returns to the function of the third connection, i.e., waiting for a central office call arrival signal.

SEVENTH CONFIGURATION FOR AN INTERNAL ZONE

By connecting Q1 with Q2 and lead 32 paging lead 26 only, paging is possible from key telephone set 11 by dialling the number NX because by this connection, amplifier 14 is grounded by contact *x*7, signal lead 26, lead 32 aand diode D7 as described for the fourth connection. When the handset is replaced, relay X is released and the paging connection is broken. Terminals H1 and H2 remain unconnected in this case.

Thus by this configuration the paging of an internal zone, i.e., all phones connected to line 22, can be accomplished without background music and central office call arrival tones.

SUMMARY OF THE FIRST SEVEN INTERNAL CONFIGURATIONS

By the use of any of the configurations one through seven, telephone set 12 and all other telephones on paging line 22 constitute one internal zone which is capable of performing any of the seven possible paging functions. Similarly, telephone set 13 and other telephones may be connected to paging lines 23 to form a second internal zone, while additional telephones may be connected to paging line 24 and thereby form a third internal zone. Obviously, by the use of additional relays, additional internal zones can be added. Most importantly, however, each internal zone can be wired to operate in any of the seven possible modes of operation.

EIGHTH CONFIGURATION FOR AN INTERNAL ZONE

When any one of the fourth to seventh configurations are established for each internal zone output, feeding signal lines 22, 23 and 24, and terminals 01, 02, 03 and 04 are connected together, each internal paging zone will perform according to the configuration that has been selected for it from among the fourth to the seventh configurations. All four connections arrangements from four to seven permit each zone to be individually paged. However, when telephone set 11 dials a predetermined number NO, a ground is supplied from register 5 via terminal 01 to relay X via diode D1, to relay Y via diode D2 and to relay Z via diode D3, and relays X, Y and Z operate. By these means, a caller's voice signal is passed to paging lines 22, 23 and 24 and to the amplifiers of each telephone set in all internal zones simultaneously. Because the amplifiers of each telephone set are grounded by their corresponding leads 26, 27, 28 and 29 in accordance with each of the fourth to seventh configurations, the voice of the caller is heard from all speakers. When the handset of telephone set 11 is restored after the call is completed, the ground from the registor circuit 5 is removed, relays X, Y and Z release, and each internal zone returns to its normal operating mode.

THE OPERATING MODES OF THE EXTERNAL ZONES

As shown in the drawing, speakers 18, 19 and 20 each form an "external zone" so called because they are external to and therefore not contained in the key telephone sets, as the internal zone speakers are. There are no individual amplifiers associated within the speakers themselves, the speakers are instead driven by one common amplifier 10 within the key service unit 1. By the configurations explained below the external zones can be made to operate in several modes, similar to the internal zones except that there is no provision for transmission of central office call signal tone.

FIRST CONFIGURATION FOR AN EXTERNAL ZONE

When terminal K1 is connected with G1, K2 with G2 and N1 with N2, the background music signal from 7 is supplied to amplifier 10 via contacts *c*2 and *c*3. Because ground is connected to amplifier 10 through terminals N1 and N2, the background music is amplified by amplifier 10 and heard from speaker 18 via contacts *c*4, *c*5, *x*5 and *x*6.

SECOND CONFIGURATION FOR AN EXTERNAL ZONE

When terminal Q1 is connected with Q2 and P1 with P2, and when number XN is dialled at telephone set 11 as described previously for the fourth internal configuration, the coil of relay X is grounded and, via diode D4, the coil of relay C; thus relays X and C operate. The voice of the caller at telephone set 11 is supplied to amplifier 10 via intercom line 36, capacitors C1 and C2 and make contacts *x*1, *x*2, *c*2 and *c*3. Since a ground is supplied via contact *c*1, the voice announcement is heard over speaker 18 via contacts *c*4, *c*5, *x*5 and *x*6. When the handset of telephone set 11 is restored after completion of the call, the ground from the register 5 is removed, relays X and C releases, and the voice signal ceases.

THIRD CONFIGURATION FOR AN EXTERNAL ZONE

When the second configuration is combined with the first, background music is heard from speaker 18 in the same manner as for the first configuration. Similarly to the second configuration, when number NX is dialled at telephone set 11, the output to external speaker 18 switches from background music to the voice signal. When the handset of telephone set 11 is replaced after call completion, relay X and C release in the same manner as in the case of the second configuration and the output to speaker 18 switches from the voice signal of telephone set 11 to background music.

Thus by the foregoing first, second and third configuraions, the output to an "external zone" speaker 18 can be connected for three different modes of operation. When Connections identical to those for the first, second and third configurations are made for each of the external zone speaker 19 and 20, it is possible to obtain any one of the same three different modes of operation in each zone.

FOURTH CONFIGURATION FOR AN EXTERNAL ZONE

When either the second or third configurations are established for speakers 18, 19 and 20 in addition terminals 01, 02, 03, 04 and 05 are connected together, each speaker individually operates in the mode corresponding to the second or third configurations accordingly. However, when number NO is dialled at telephone set 11, relay coil X is grounded via diode D1, relay coil Y via diode D2, relay coil Z via diode D3 and relay coil C via diode D9, and relays X, Y, Z and C operate. The voice signal from telephone set 11 is then presented to amplifier 10 as previously described and is heard simultaneously in the three external zones through speakers 18, 19 and 20. When the handset of telephone set 11 is replaced after the call in completed, the ground is removed, relays X, Y, Z and C release, and the respective speakers switch back to their former operating modes.

Therefore, by this configuration all external zones may be paged simultaneously from telephone set 11.

COMBINED INTERNAL AND EXTERNAL ZONE CONFIGURATION

When any of the external zones are connected according to their first configuration, the corresponding internal zones may be connected according to any of the first to the third configurations and the two zones will operate independently, that is neither will have paging. For example, when the first internal zone is connected according to the first internal configuration with background music and the corresponding external zone is connected in the same mode, the background music will be heard simultaneously from telephone set 12 and from speaker 18. Similarly, each of the pairs of internal and external zones switched by a common relay X, Y or Z, may be connected in a similar manner without conflict.

Further, when the paired internal and external zones are both connected for paging and some combination of other signals, they will operate independently. For example, when the internal zone is connected according to the fourth configuration (background music and paging only) and the external zone is connected for external paging only with no background music on the external speaker, when the number NX is dialled at telephone set 11, the output of speaker 16 of telephone set 12 will switch from the background music to the voice signal from telephone set 11 and will also be heard from speaker 18. When the handset of telephone set 11 is replaced after call completion, the output of speaker 16 of telephone set 12 will switch back to the background music. No output will be heard at external zone speaker 18.

Connections identical to this made for the external zone speaker 19 and internal zone telephone sets connected to paging line 23 (or speaker 20 and internal zone telephone sets connected to paging line 24) will operate in the same manner as explained above.

FINAL ALL ZONE PAGING CONFIGURATION

When terminals 01, 02, 03, 04 and 05 are connected in addition to the connections above, and additionally number NO is dialled at telephone set 11, relays X, Y, Z and C operate connecting the voice signal from telephone set 11 to speakers 18, 19 and 20 and to the speakers connected to paging lines 22, 23 and 24. When the handset of telephone set 11 is replaced after the completion of paging, relays X, Y, Z and C release, and the zones return to normal operation.

By the present invention as described by the various connecting configurations, it is possible to send central office line call signal tone, voice paging and the background music to a plurality of internal zones comprising a speaker and amplifier in each key telephone set in a key telephone system and additionally call all zones simultaneously in a paging mode. Secondly, it is possible to send a voice signal and background music to a plurality of external zones comprising loudspeakers and common amplifier external to a key telephone system, and additionally to call all zones simultaneously in a paging mode. Thirdly, it is possible to set up multiple external and internal zones and send central office line call signal tones and background music to a number of internal and external zones while and without interference sending out voice paging signals to other multiple internal and external zones.

It is to be understood that the embodiment of this invention described herein is merely intended to illustrate the operative principles of the invention and is not to be considered as limiting the scope of the invention. Modifications may be made by those skilled in the art without departing from the spirit of the invention.

What is claimed is:

1. A switching circuit means for use in audible signal and intercom speech circuits of a key telephone system having a plurality of key telephone sets, each having an audible signal and an input terminal, an internal amplifier and a speaker; the switching circuit means comprising;

an audio signal generating means having a first output signal connected to a first terminal means;

a central office line circuit means having a second output signal connected to a second terminal means;

an intercom line circuit means having a third output signal from the intercom speech circuits of the key telephone system connected to a third output terminal; and switching means connected between the three output terminal means and the input terminals of a preselected group of key telephone sets, the switching means disconnecting said audio signal generating means from said key telephone group in response to an output signal from one of said line circuit means and connecting the output of said line circuit means to said key telephone sets.

2. A switching circuit as in claim 1 further comprising means for connecting up a plurality of key telephone sets in a plurality of zones each of the zones being connected to at least one of the outputs from said audio signal generating means, said central office line circuit means and said intercom line circuit means and, means for selectively connecting an output signal from said audio signal generating means, central office line circuit means and intercom line circuit means to at least one preselected zone, independent of said other zones.

3. A switching circuit means as in claim 1 further comprising;

amplifying means coupled to the first and third output terminals;

a plurality of speakers, coupled to the output of said amplifying means, said comprising an external zone; and means for disconnecting said amplifying means from said first output terminal and connecting said amplifying means to said third output terminal in response to an output signal from said intercom line circuit means, said disconnecting means also disconnecting said amplifying means from said third output terminal and reconnecting said amplifying means to said audio signal means upon the termination of the signal from said intercom line circuit means.

4. A switching circuit means as in claim 3 further comprising;

means for interconnecting a plurality of key telephone sets, each having internal speakers and amplifiers, with the plurality of said speakers, said combination of key telephone sets and speakers forming a second zone;

means for connecting said second zone to said audio generating means and said intercom line circuit means, and said disconnecting means; and means for selectively coupling said external zone and said second zone to said audio generating means and said intercom line circuit means independent of said other zone.

5. A switching circuit means as in claim 4 in which said second zone comprises;

a first, second and third sub-zone;

said first sub-zone comprised of key telephone sets, each of said sets having internal speakers and amplifiers;

said second sub-zone comprised of a plurality of speakers;

said third sub-zone comprised of a combination of speakers and key telephones having internal speakers and amplifiers; and means for selectively connecting said sub-zones to said audio signal generating means, central office line circuit means and said intercom circuit means to form a plurality of sub-zones in which each sub-zone is connected and disconnected to said means independent of each other sub-zone.

6. A switching circuit means as in claim 5 further comprising means for connecting all zones and sub-zones to said intercom line circuit means for permitting intercom calling to all zones and sub-zones simultaneously.

* * * * *